United States Patent
Funabashi et al.

(10) Patent No.: US 7,697,240 B2
(45) Date of Patent: Apr. 13, 2010

(54) MAGNETIC HEAD ACTUATOR AND MAGNETIC DISK DEVICE HAVING DAMPER MATERIAL ATTACHED TO ACTUATOR ARM

(75) Inventors: Kei Funabashi, Kawasaki (JP); Keiji Aruga, Kawasaki (JP)

(73) Assignee: Toshiba Storage Device Corporation, Tokyo (JP)

( * ) Notice: Subject to any disclaimer, the term of this patent is extended or adjusted under 35 U.S.C. 154(b) by 379 days.

(21) Appl. No.: 11/043,015

(22) Filed: Jan. 25, 2005

(65) Prior Publication Data
US 2005/0152070 A1 Jul. 14, 2005

Related U.S. Application Data

(63) Continuation of application No. PCT/JP02/11320, filed on Oct. 30, 2002.

(51) Int. Cl.
*G11B 5/55* (2006.01)
(52) U.S. Cl. .................. 360/265.9; 360/266
(58) Field of Classification Search ............. 360/265.7, 360/244.3, 244.9, 265.9, 266
See application file for complete search history.

(56) References Cited

U.S. PATENT DOCUMENTS

| | | | |
|---|---|---|---|
| 4,760,478 A | 7/1988 | Pal et al. | |
| 4,819,094 A * | 4/1989 | Oberg | 360/245.9 |
| 5,606,477 A * | 2/1997 | Erpelding et al. | 360/244.3 |
| 5,650,894 A * | 7/1997 | Ikeda | 360/244.3 |
| 5,691,861 A | 11/1997 | Ohba | |
| 5,796,553 A * | 8/1998 | Tangren | 360/244.9 |
| 5,801,905 A * | 9/1998 | Schirle et al. | 360/265.9 |
| 5,955,176 A * | 9/1999 | Erpelding et al. | 428/209 |
| 6,005,750 A * | 12/1999 | Willard et al. | 360/244.8 |
| 6,215,623 B1 * | 4/2001 | Zhu | 360/244.3 |
| 6,271,996 B1 * | 8/2001 | Houk et al. | 360/244.9 |
| 6,563,676 B1 * | 5/2003 | Chew et al. | 360/264.7 |
| 6,594,114 B1 * | 7/2003 | Suzuki et al. | 360/244.3 |
| 6,731,466 B2 * | 5/2004 | Arya | 360/244.3 |
| 6,785,094 B2 * | 8/2004 | Arya et al. | 360/244.3 |
| 6,801,405 B2 * | 10/2004 | Boutaghou et al. | 360/265.9 |
| 6,879,467 B2 * | 4/2005 | Shimizu et al. | 360/265.9 |
| 6,982,852 B2 * | 1/2006 | Nagahiro et al. | 360/265.9 |
| 7,064,932 B1 * | 6/2006 | Lin et al. | 360/265.9 |
| 7,133,259 B2 * | 11/2006 | Takagi et al. | 360/244.3 |
| 7,352,537 B2 * | 4/2008 | Dominguez et al. | 360/265.7 |
| 2002/0057536 A1 * | 5/2002 | Boutaghou et al. | 360/265.9 |
| 2003/0169537 A1 * | 9/2003 | Weichelt et al. | 360/265.9 |
| 2003/0218833 A1 * | 11/2003 | Nagahiro et al. | 360/265.9 |
| 2006/0291104 A1 * | 12/2006 | Dominguez et al. | 360/265.7 |

FOREIGN PATENT DOCUMENTS

| | | |
|---|---|---|
| EP | 0 121 057 | 10/1984 |
| JP | 59-180855 | 10/1984 |
| JP | 9-007145 | 1/1997 |
| JP | 11-66780 | 3/1999 |

* cited by examiner

*Primary Examiner*—Jefferson Evans
(74) *Attorney, Agent, or Firm*—Greer, Burns & Crain, Ltd.

(57) ABSTRACT

The present invention relates to a magnetic head actuator and a magnetic disk device in which a magnetic head is moved to a predetermined position by actuating an arm on a revolving magnetic disk. A magnetic head actuator comprises an arm in which a suspension for supporting a magnetic head is provided, the arm being actuated to move the magnetic head. A damper material is provided on at least one side of the arm, the damper material comprising a restriction material and a viscoelastic material, the restriction material suppressing vibrations of the arm, and the viscoelastic material absorbing vibrations of the arm.

14 Claims, 12 Drawing Sheets

PRIOR ART

MAGNETIC HEAD ACTUATOR AND MAGNETIC DISK DEVICE HAVING DAMPER MATERIAL ATTACHED TO ACTUATOR ARM

CROSS-REFERENCE TO RELATED APPLICATIONS

This application is a U.S. continuation application which is filed under 35 USC 111(a) and claims the benefit under 35 USC 120 and 365(c) of International Application No. PCT/JP2002/011320, filed on Oct. 30, 2002, the entire contents of which are hereby incorporated by reference.

BACKGROUND OF THE INVENTION

1. Field of the Invention

The present invention generally relates to a magnetic head actuator and a magnetic disk device, and more particularly to an actuator for a magnetic head and a magnetic disk device having the actuator in which the magnetic head is moved to a predetermined position by driving the arm on the revolving magnetic disk.

For example, in the magnetic disk device, such as a hard disk drive (HDD), the head slider of the magnetic head is lifted over the surface of the revolving magnetic disk and the magnetic-head element performs reading information from or writing information to the magnetic disk in the lifted state of the head slider. In recent years, in order to increase the recording density of the magnetic disk, reducing the lifting height of the head slider and making the magnetic-head element small have been proposed. In order to accurately position the magnetic-head element to the predetermined track of the magnetic disk whose recording density is thus increased, it is necessary to reduce the vibrations of the arm which is moved over the magnetic disk surface.

2. Description of the Related Art

FIG. 1 shows an example of the conventional magnetic disk device 1. The state of the conventional magnetic disk device 1 in which the top cover is removed is illustrated in FIG. 1.

The magnetic disk device 1 generally comprises the housing 2, the magnetic disk 3, the actuator 4 for the magnetic head (called the head actuator 4), and the voice-coil motor 5.

The housing 2 is provided with the cover which is not illustrated, thereby preventing the inclusion of dirt in the magnetic disk device from the exterior and protecting the respective above-mentioned components 3 and 4 and 5 from damage. Moreover, the magnetic disk 3 is rotated at high speed with a predetermined rotation speed by the spindle motor which is not shown in FIG. 1.

As shown in FIG. 2 and FIG. 3, the head actuator 4 comprises the E-block 14 in which the plurality of actuator arms 6 (in this example, the five actuator arms) are provided. Moreover, the shaft hole 12 in which the shaft 8 embedded in the housing 2 is inserted is formed approximately in the center of the E-block 14. Furthermore, the coil 13 which constitutes part of the voice-coil motor 5 is arranged in the position which is opposite to the position where the actuator arm 6 is arranged with respect to the position of the shaft hole 12.

Each of the actuator arms 6 is a plate-like member which is made of aluminum. The actuator arms 6 are provided on the E-block 14 as mentioned above. The suspension attachment part 11 is provided at the leading edge of each of the actuator arms 6, and the suspension 7 on which the magnetic head is carried is attached to the suspension attachment part 11. Usually, the suspension 7 (which is not shown in FIG. 2 and FIG. 3) is fixed to the suspension attachment part 11 by crimping.

The voice-coil motor 5 comprises the coil 13 which is provided in the head actuator 4, the magnet which generates the magnetic force, and the yoke 5a which is provided for applying the magnetic force to the coil 13, etc.

The magnet is constituted so that the magnetic force generated by the magnet may penetrate the coil 13. By varying the current supplied to the coil 13, the force to cause the head actuator 4 to be rotated around the rotation axis of the shaft 8 is generated. Thereby, the head actuator 4 is rotated around the shaft 8 to move the magnetic head, attached to the leading edge of the actuator arm 6 through the suspension 7, to the predetermined position on the magnetic disk 3.

A description will be given of the actuator arm 6. In order to attain weight reduction of the actuator arm 6, the slot 15 is formed in the actuator arm 6 as the through hole which penetrates the actuator arm 6 in the direction perpendicular to the paper of the figure. Thus, the moment of inertia of the actuator arm 6 can be reduced by forming the slot 15 in the actuator arm 6. For this reason, it is possible to attain high-speed accessing of the head actuator 4 with the slot 15 for weight reduction being formed.

By the way, the actuator arm 6 in which the slot 15 is formed has various oscillation modes in the range from several kHz to several 10 kHz. FIG. 4 is a diagram for explaining the oscillation characteristic of the head actuator in the conventional magnetic disk device of FIG. 1.

As shown in FIG. 4, the damping of the actuator arm 6 to the oscillation modes is very low because the actuator arm is formed by the integral structure of a metallic member. The damping coefficient $\zeta$ is on the order of 0.01. In other words, the resonance scale factor at the time of resonance will become about 50 times. This means that a great peak of the resonance occurs at the time of resonance, and the positioning accuracy of the head actuator will deteriorate.

On the other hand, the recording density of the magnetic disk is doubled every year as mentioned above, and the track density (TPI) is increased at an annual rate of 50% or more. Therefore, in order to increase the track density, it is necessary to raise the positioning accuracy.

In the latest magnetic disk device, the track pitch of 0.4 micrometers is attained, and the permissible NRRO (the oscillation accuracy) amounts to 50 nm.

Especially, in the case of the high-speed rotation disk (10,000 rpm, 15,000 rpm), when the air flow generated inside when the magnetic disk 3 is rotated at high speed collides with the actuator arm 6, the aerodynamic vibrations of the actuator arm 6 occur. The state in which the actuator arm 6 is oscillated by the natural vibration during the aerodynamic vibration is shown at the positions (about 7.6 kHz, 12.0 kHz) indicated by the arrows A and B in FIG. 4.

Although the high-speed accessing of the head actuator 4 is intended by forming the slot 15, if aerodynamic vibrations occur on the actuator arm 6 and there is the excitation by the natural vibration of the actuator arm 6, then the positioning accuracy will fall by the vibrations of the actuator arm 6. For this reason, it is very difficult to accurately position the magnetic head at the predetermined position.

SUMMARY OF THE INVENTION

An object of the present invention is to provide an improved magnetic head actuator and magnetic disk device in which the above-described problems are eliminated.

Another object of the present invention is to provide a magnetic head actuator which effectively reduces the influences of the aerodynamic vibrations on the arm.

Another object of the present invention is to provide a magnetic disk device which effectively reduces the influences of the aerodynamic vibrations on the arm.

The above-mentioned objects of the present invention are achieved by a magnetic head actuator comprising: an arm in which a suspension for supporting a magnetic head is provided, the arm being actuated to move the magnetic head; and a damper material provided on at least one side of the arm, the damper material increasing a rigidity of the arm and absorbing vibrations of the arm.

According to the present invention, the damper material serves to increase the rigidity of the arm and absorb the vibrations of the arm, even though the aerodynamic oscillation force is applied to the arm by the air flow generated with the rotation of the magnetic disk. For this reason, it is possible to prevent unnecessary vibrations from occurring on the arm, and it is possible to position the magnetic head by the magnetic head actuator with a high level of accuracy.

Moreover, the above-mentioned objects of the present invention are achieved by a magnetic head actuator comprising: an arm in which a suspension for supporting a magnetic head is provided, the arm being actuated to move the magnetic head; and a damper material provided on at least one side of the arm, the damper material comprising a restriction material and a viscoelastic material, the restriction material suppressing vibrations of the arm, and the viscoelastic material absorbing vibrations of the arm.

According to the present invention, the restriction material of the damper material serves to suppress the vibrations of the arm and the viscoelastic material of the damper material serves to absorb the vibrations of the arm, even though the aerodynamic oscillation force is applied to the arm by the air flow generated with the rotation of the magnetic disk. For this reason, it is possible to prevent unnecessary vibrations from occurring on the arm, and it is possible to position the magnetic head by the magnetic head actuator with a high level of accuracy.

Moreover, the magnetic head actuator of the above-mentioned invention may be configured so that the damper material is arranged on both sides of the arm symmetrically.

Since the damper material is symmetrically arranged on both sides of the arm, the balance of the arm becomes appropriate and it is possible to suppress more effectively the unnecessary vibration from occurring on the arm.

Moreover, the magnetic head actuator of the above-mentioned invention may be configured so that the arm is formed with a weight-reduction part, and the damper material is arranged on the arm at a position including a position of the arm where the weight-reduction part is formed.

Since the weight of the arm is reduced and the moment of inertia is also reduced by providing the weight reduction part in the arm, shortening of the seek time can be aimed at by the magnetic head actuator. Moreover, unnecessary vibration occurring in the weight reduction part can be suppressed by arranging the damper material in the position including the formation position of the weight reduction part of the arm.

That is, in the case of the conventional device in which the weight reduction part is exposed, the air flow enters the weight reduction part, and the arm is subjected to the unnecessary vibrations due to the air flow. However, according to the present invention, the weight reduction part is enclosed by the damper material by arranging the damper material at the position including the formation position of the weight reduction part of the arm. For this reason, the unnecessary vibrations due to the air flow entering the weight reduction part can be suppressed, and it is therefore possible to position the magnetic head by the magnetic head actuator with a high level of accuracy.

Moreover, the magnetic head actuator of the above-mentioned invention may be configured so that the damper material is arranged on the arm partially.

According to the above-mentioned composition, it is possible to adjust the vibration-proof effect with the arrangement position and the area of the damper material.

Moreover, the magnetic head actuator of the above-mentioned invention may be configured so that the damper material is made of a material having a rigidity higher than a rigidity of aluminum. Or the magnetic head actuator of the above-mentioned invention may be configured so that the damper material is made of a stainless steel.

According to the above-mentioned composition, the damper material has the high rigidity, and it is possible to prevent certainly the vibrations of the arm due to the air flow.

Moreover, the magnetic head actuator of the above-mentioned invention may be configured so that the arm is formed with a weight reduction part, the damper material is arranged on the arm at a position including a position of the arm where the weight reduction part is formed, and a part of the viscoelastic material located at a position of the damper material opposing the position of the weight reduction part is removed.

According to the above-mentioned composition, it is possible to prevent the dirt entering the weight reduction part at the time of the assembly from sticking to the viscoelastic material, and therefore the reliability of the magnetic disk device in which the magnetic head actuator is provided can be raised.

Moreover, the magnetic head actuator of the above-mentioned invention may be configured so that the arm is formed with a weight reduction part, the damper material is arranged on the arm at a position including a position of the arm where the weight reduction part is formed, and an opening is formed at a position of the damper material opposing the position of the weight reduction part.

According to the above-mentioned composition, the moment of inertia of the arm including the damper material can be reduced while the absorption of the vibrations is aimed at and the rigidity of the arm is raised. Thereby, it is possible to attain the high-speed seek processing and the highly accurate positioning processing of the magnetic head compatibly with the moving processing of the magnetic head.

Moreover, the magnetic head actuator of the above-mentioned invention may be configured so that a tail part of the suspension is attached to the arm using the viscoelastic material.

According to the above-mentioned composition, the tail part of the suspension is attached to the arm using the viscoelastic material, and it is no longer necessary to provide the additional composition for fixing the tail part to the actuator arm as in the conventional head actuator, and the composition of the head actuator can be simplified.

Moreover, the above-mentioned objects of the present invention are achieved by a magnetic disk device including a magnetic disk provided as a recording medium, a rotation unit rotating the magnetic disk, and a magnetic head actuator, the magnetic head actuator comprising: an arm in which a suspension for supporting a magnetic head is provided, the arm being actuated to move the magnetic head; and a damper material provided on at least one side of the arm, the damper material increasing a rigidity of the arm and absorbing vibrations of the arm.

According to the present invention, the damper material serves to increase the rigidity of the arm and absorb the vibrations of the arm, even though the aerodynamic oscillation force is applied to the arm by the air flow generated with the rotation of the magnetic disk. For this reason, it is possible to prevent unnecessary vibrations from occurring on the arm, it is possible to position the magnetic head by the magnetic head actuator with a high level of accuracy, and the reliability of the magnetic disk device can be raised.

Moreover, the above-mentioned objects of the present invention are achieved by a magnetic disk device including a magnetic disk provided as a recording medium, a rotation unit rotating the magnetic disk, and a magnetic head actuator, the magnetic head actuator comprising: an arm in which a suspension for supporting a magnetic head is provided, the arm being actuated to move the magnetic head; and a damper material provided on at least one side of the arm, the damper material comprising a restriction material and a viscoelastic material, the restriction material suppressing vibrations of the arm, and the viscoelastic material absorbing vibrations of the arm.

According to the present invention, the restriction material of the damper material serves to suppress the vibrations of the arm and the viscoelastic material of the damper material serves to absorb the vibrations of the arm, even though the aerodynamic oscillation force is applied to the arm by the air flow generated with the rotation of the magnetic disk. For this reason, it is possible to prevent unnecessary vibrations from occurring on the arm, it is possible to position the magnetic head by the magnetic head actuator with a high level of accuracy, and the reliability of the magnetic disk device can be raised.

BRIEF DESCRIPTION OF THE DRAWINGS

Other objects, features and advantages of the present invention will be apparent from the following detailed description when read in conjunction with the accompanying drawings.

DETAILED DESCRIPTION OF PREFERRED EMBODIMENTS

A description will now be given of the preferred embodiments of the invention with reference to the accompanying drawings.

Figure 5:
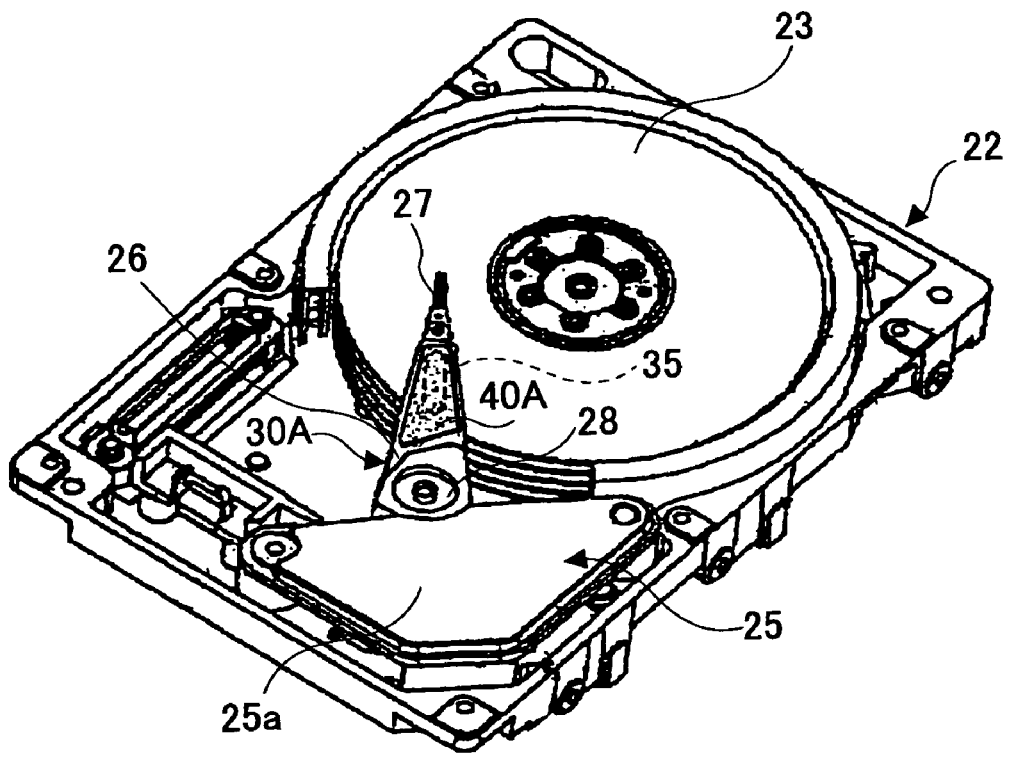
FIG. 5 is a perspective view of the magnetic disk device in which the head actuator in the first preferred embodiment of the invention is provided.

FIG. 5 shows the composition of the magnetic disk device 20 in which the head actuator 30A in the first preferred embodiment of the invention is provided. In addition, the state of the magnetic disk device 20 in which the top cover is removed is illustrated.

The magnetic disk device 20 generally comprises the housing 22, the magnetic disk 23, the actuator 30A for the magnetic head (called the head actuator 30A), and the voice-coil motor 25.

The housing 22 is provided with the cover which is not illustrated, thereby preventing the inclusion of dirt in the magnetic device from the exterior and protecting the respective above-mentioned components 23, 25 and 30A from damage. Moreover, the magnetic disk 23 is rotated at high speed at a predetermined rotation speed (for example, 10,000 rpm, 15,000 rpm) by the spindle motor which is not shown in FIG. 5.

Figure 6:
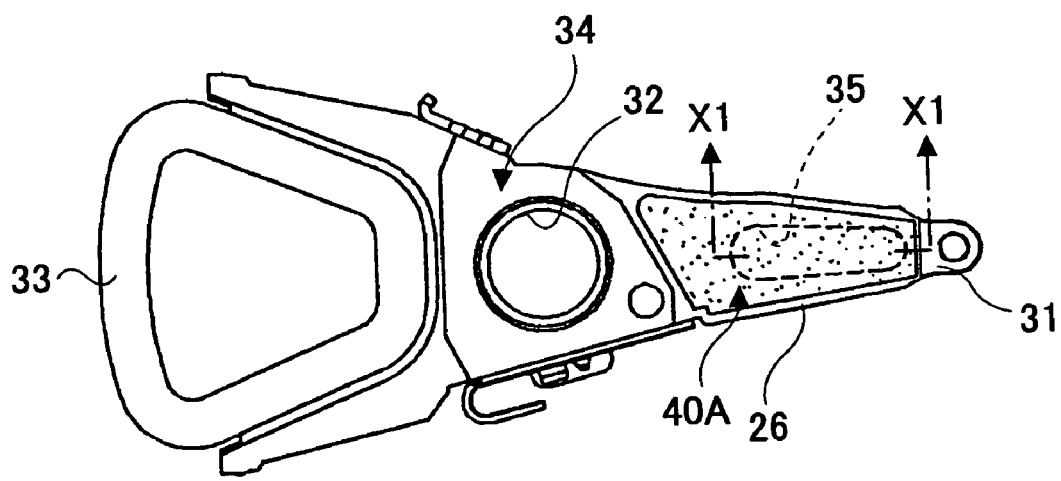
FIG. 6 is an enlarged plan view of the head actuator in the first preferred embodiment of the invention.
Figure 7:
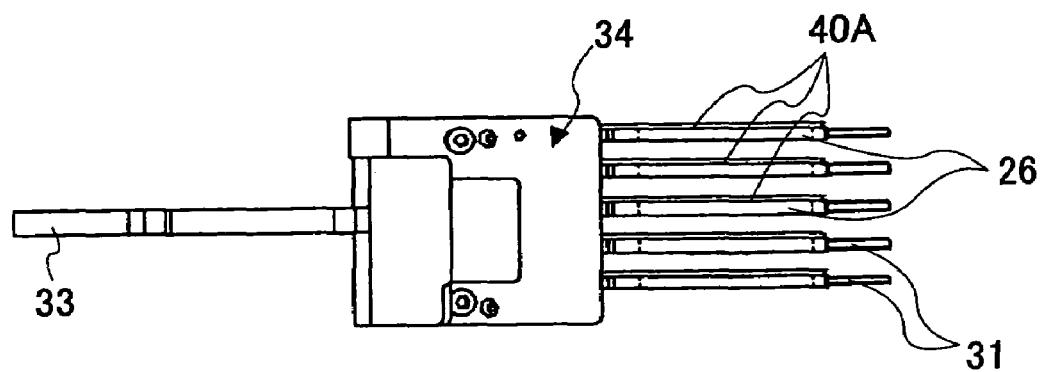
FIG. 7 is an enlarged front view of the head actuator in the first preferred embodiment of the invention.

As shown in FIG. 6 and FIG. 7, the head actuator 30A comprises the E-block 34 in which the plurality of the actuator arms 26 (in this example, the five actuator arms) are provided. Moreover, the shaft hole 32 in which the shaft 28 embedded in the housing 22 is inserted is formed approximately in the center of the E-block 34. Furthermore, the coil 33 which constitutes part of the voice-coil motor 25 is arranged in the position which is opposite to the position where the actuator arm 26 is arranged with respect to the position of the shaft hole 32.

Each of the actuator arms 26 is a plate-like member which is made of aluminum. The actuator arms 26 are provided on the E-block 34. The suspension attachment part 31 is provided at the leading edge of each of the actuator arms 26, and the suspension 27 on which the magnetic head is carried is attached to the suspension attachment part 31. Usually, the suspension 27 (which is not shown to FIG. 6 or FIG. 7) is fixed to the suspension attachment part 31 by crimping.

Moreover, in order to attain weight reduction of the actuator arm 26, the slot 35 is formed in the actuator arm 26. In addition, the weight reduction means either making the actuator arm 26 thin in the thickness direction of the actuator arm 26 (which is the up/down direction in FIG. 7), or forming the through hole, penetrating the actuator arm 26 in the up/down direction, in the actuator arm 26 (in this embodiment, the slot 35 penetrating the actuator arm in the up/down direction is given as the example for the weight reduction).

Thus, the moment of inertia of the actuator arm 26 can be reduced by forming the slot 35 for the weight reduction. For this reason, it is possible to attain high-speed accessing of the head actuator 30A by forming the slot 35 for the weight reduction.

However, the actuator arm 26 is formed with the slot 35 which is constituted by the recess or the opening, the actuator arm 26 is easily influenced by the air flow generated at the time of the high-speed rotation of the magnetic disk 23. That is, the aerodynamic vibrations of the actuator arm 26 are likely to arise.

The voice-coil motor 25 comprises the coil 33 which is provided in the head actuator 30A, the magnet (not shown in the figure) which generates the magnetic force, and the yoke 25a which is provided for applying the magnetic force to the coil 33.

The magnet is constituted so that the magnetic force generated by the magnet may penetrate the coil 33. By varying the current supplied to the coil 33, the force to rotate the head actuator 30A around the shaft 28 is generated. Thereby, the head actuator 30A is rotated around the rotation axis of the shaft 28 to move the magnetic head, attached to the leading edge of the actuator arm 26 through the suspension 27, to the predetermined position on the magnetic disk 23.

Next, a description will be given of the damper material 40A. The damper material 40A in this embodiment (indicated by the dotted area in FIG. 5 and FIG. 6) is arranged on the actuator arm 26 in the comparatively wide area from the position where the suspension attachment part 31 is formed to the vicinity of the position where the shaft hole 32 is formed. Therefore, the damper material 40A is formed so as to include the position where the slot 35 is formed. Thereby, the damper material 40A is provided on the actuator arm 26 so that the damper material 40A closes the slot 35. Furthermore, the damper material 40A in this embodiment is arranged only on one side of the actuator arm 26 as shown in FIG. 7.

Figure 8:
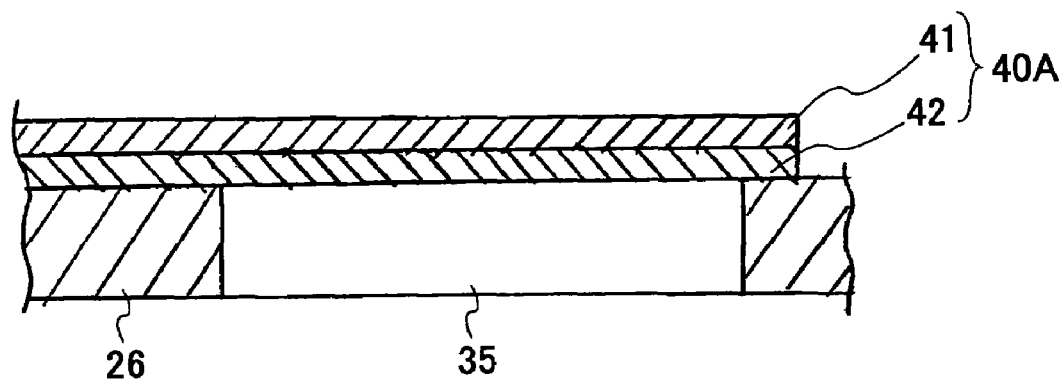
FIG. 8 is a cross-sectional view of the head actuator which is taken along the X1-X1 line in FIG. 6.

FIG. 8 is a cross-section view of the head actuator 30A which is taken along the X1-X1 line in FIG. 6.

As shown in FIG. 8, the damper material 40A is provided as the laminated structure which includes the restriction material 41 and the viscoelastic material 42.

The restriction material 41 is made of a material having a rigidity higher than a rigidity of the aluminum which is the material making the actuator arm 26. Specifically, the restriction material 41 in this embodiment is made of a stainless steel board with a thickness of about 50 micrometers (in addition, the thickness of the actuator arm 26 is about 0.9 mm).

Moreover, the viscoelastic material 42 is made of, for example, a double-sided adhesive tape (for example, the trade name: VEM) with a thickness of about 50 micrometers. Specifically, the double-sided adhesive tape is formed with the adhesive applied to both sides of a resin base tape. Therefore, the restriction material 41 is fixed to the actuator arm 26 by the viscoelastic material 42.

Moreover, since the resin base tape of the viscoelastic material 42 serves as the base material, the viscoelastic material 42 functions as a damper which absorbs vibrations with the elasticity of the resin base tape.

Thus, the damper material 40A in the present embodiment has the compound structure including the restriction material 41 with the high rigidity and the viscoelastic material 42 with the vibration absorbing function, and this damper material 40A is provided on the actuator arm 26. Even if the aerodynamic oscillation force is applied to the actuator arm 26 by the air flow generated with the high-speed rotation of the magnetic disk 23, the rigidity of the actuator arm 26 is raised by the damper material 40A and the vibrations of the actuator arm 26 can be absorbed.

Specifically, the vibrations of the actuator arm 26 generated by the aerodynamic vibration force can be suppressed by the restriction material 41 of the damper material 40A, and the still remaining vibrations of the actuator arm 26 can be absorbed by the viscoelastic material 42 of the damper material 40A. For this reason, it is possible to prevent unnecessary vibrations from occurring on the actuator arm 26, and it is therefore possible to position the magnetic head by the head actuator 30A with a high level of accuracy. Moreover, the reliability of the magnetic disk device 20 can be raised by using the head actuator 30A.

Figure 1:
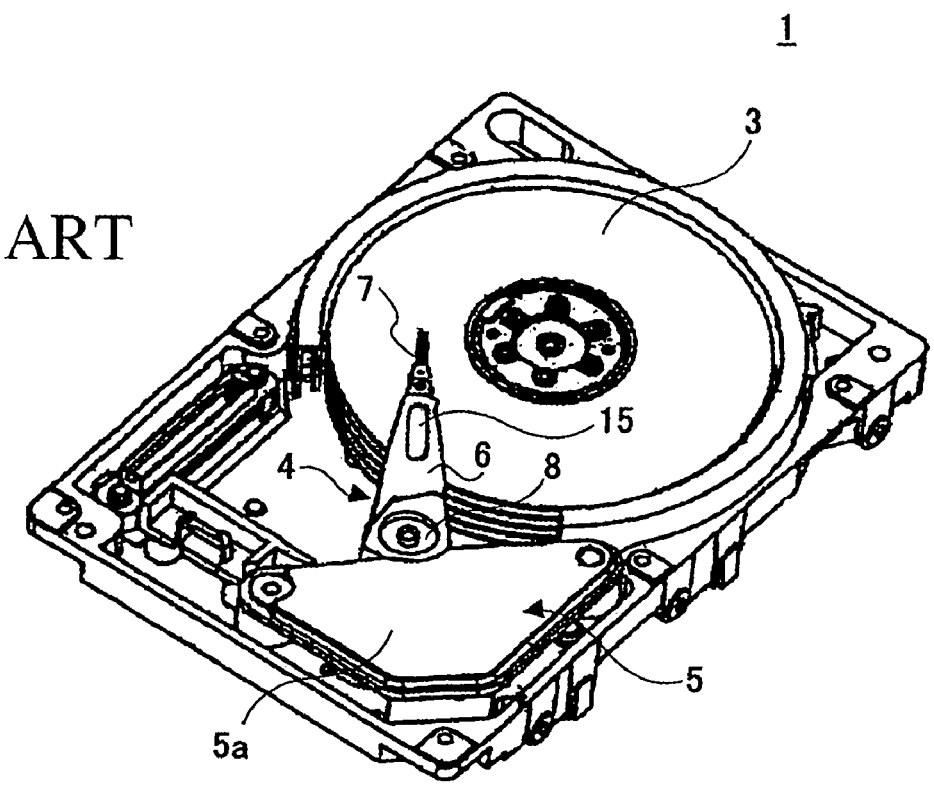
FIG. 1 is a perspective view of an example of the conventional magnetic disk device in which the head actuator is provided.
Figure 2:
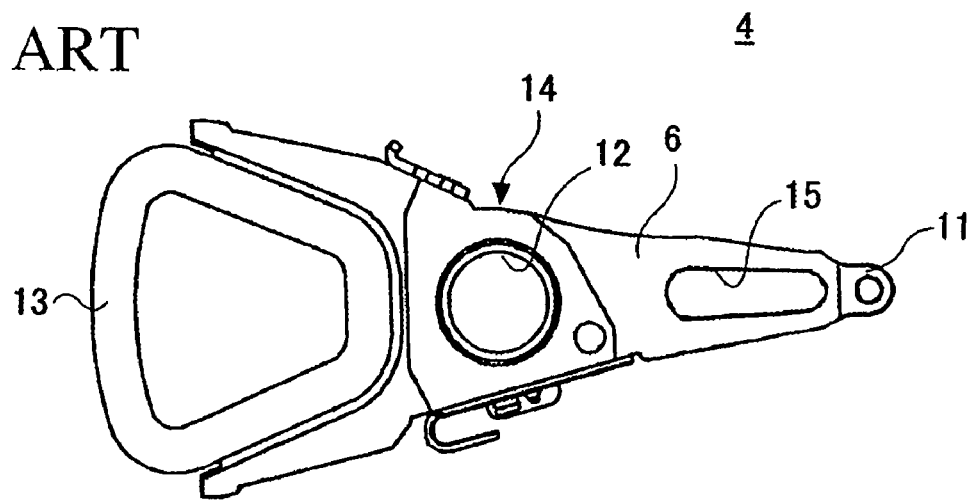
FIG. 2 is an enlarged plan view of the head actuator in the conventional magnetic disk device of FIG. 1.
Figure 3:
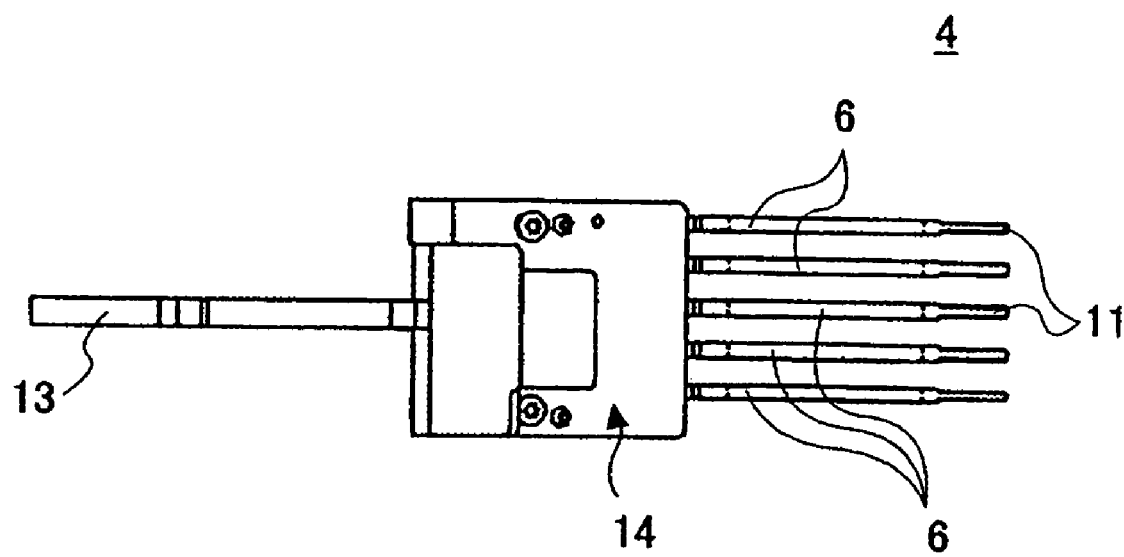
FIG. 3 is an enlarged front view of the head actuator in the conventional magnetic disk device of FIG. 1.

In the above-described embodiment, the damper material 40A is arranged so that the position of the damper material 40A includes the position where the slot 35 is formed. By this arrangement, it is possible to suppress the occurrence of unnecessary vibrations due to the slot 35 formed in the actuator arm 30A. Namely, in the case of the conventional magnetic disk device shown in FIG. 1 to FIG. 3, the slot 15 for the weight reduction is exposed, when the air flow enters the slot 15, the actuator arm 6 is oscillated and unnecessary vibrations of the actuator arm 6 occur.

However, in the present embodiment, the damper material 40A is arranged in the position including the position of the actuator arm 26 where the slot 35 for the weight reduction is formed, so that the slot 35 is enclosed by the damper material 40A. For this reason, it is possible for the present embodiment to prevent unnecessary vibrations from occurring on the actuator arm 26 due to the air flow entering the slot 35.

Figure 4:
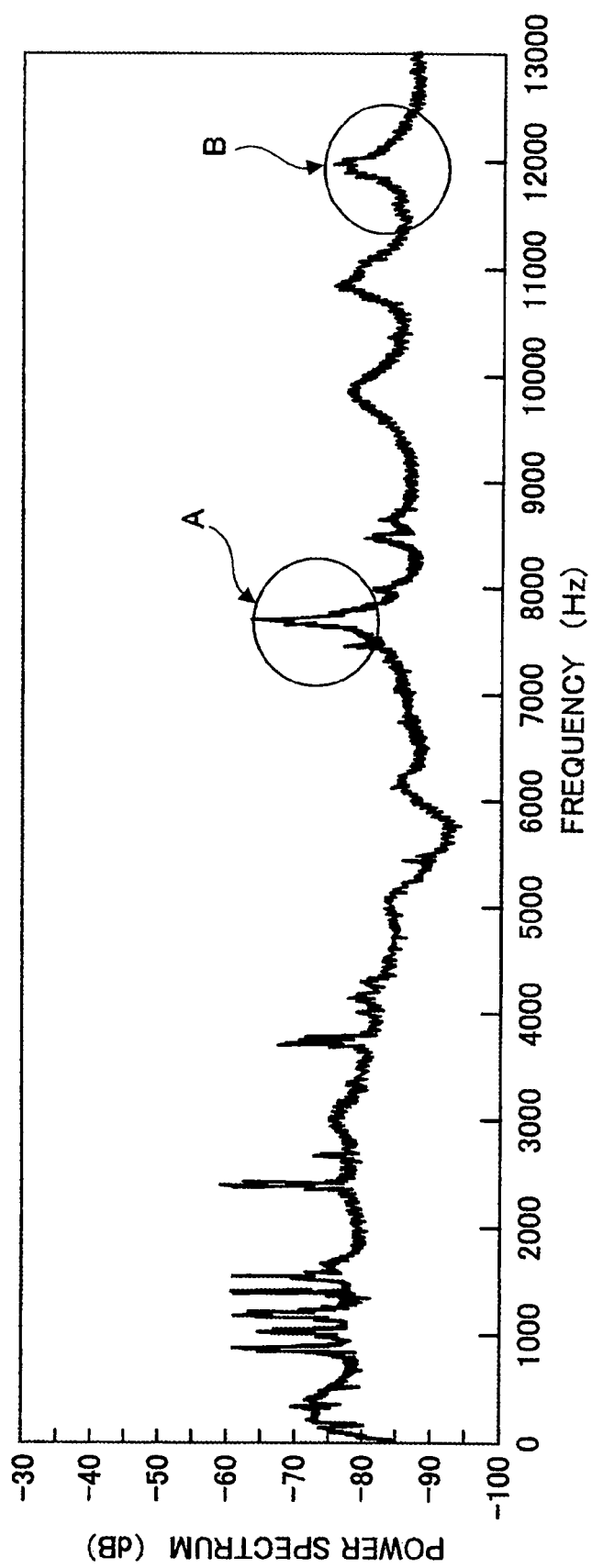
FIG. 4 is a diagram for explaining the oscillation characteristic of the head actuator in the conventional magnetic disk device of FIG. 1.
Figure 9:
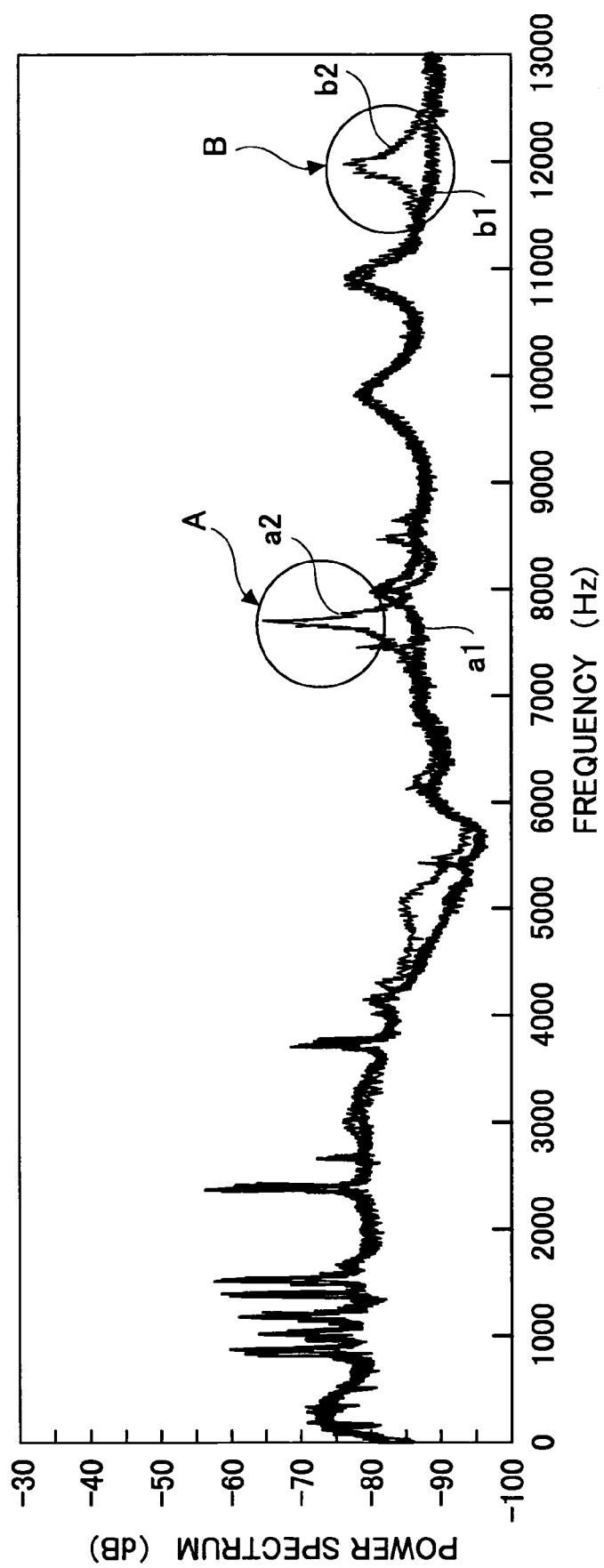
FIG. 9 is a diagram for explaining the oscillation characteristic of the head actuator in the first preferred embodiment of the invention.

FIG. 9 shows the oscillation characteristic (NRRO spectrum) of the actuator arm 26 in the present embodiment in which the damper material 40A is provided. In addition, FIG. 9 shows also the oscillation characteristic (NRRO spectrum) of the conventional actuator arm 6 shown in FIG. 4, for the purpose of comparison.

In the oscillation characteristic of FIG. 9, the frequencies at which the actuator arm 26 is oscillated by the natural vibration during the aerodynamic vibration are about 7.6 kHz and about 12.0 kHz, which are indicated by the arrows A and B in FIG. 9.

At the frequency of about 7.6 kHz, the peak of the vibration occurs in the conventional actuator arm 6 as indicated by the letter a2 in FIG. 9 while no peak of the vibration occurs in the present embodiment using the damper material 40A as indicated by the letter a1 in FIG. 9.

Moreover, at the frequency of about 12.0 kHz, the peak of the vibration occurs in the conventional actuator arm 6 as indicated by the letter b2 in FIG. 9 while no peak of the vibration occurs in the present embodiment using the damper material 40A as indicated by the letter b1 in FIG. 9.

As is apparent from FIG. 9, since the damper material 40A is arranged on the actuator arm 26, it is possible to suppress the vibrations of the actuator arm 26 resulting from the aerodynamic vibrations.

In addition, in the above-described embodiment, the damper material 40A is arranged on all the plurality of the actuator arms 26. However, it is not necessarily required to arrange the damper material 40A on all the actuator arms 26. Alternatively, the damper material 40A may be arranged only on the actuator arm 26 which is likely to receive the influences of the aerodynamic vibrations.

Figure 10:
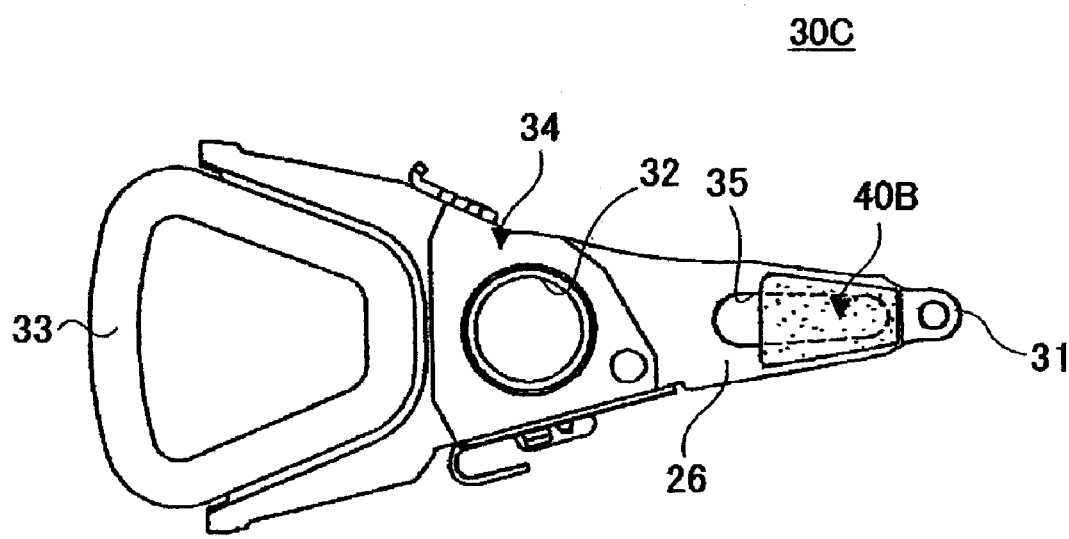
FIG. 10 is a plan view of the head actuator in the second preferred embodiment of the invention.
Figure 11:
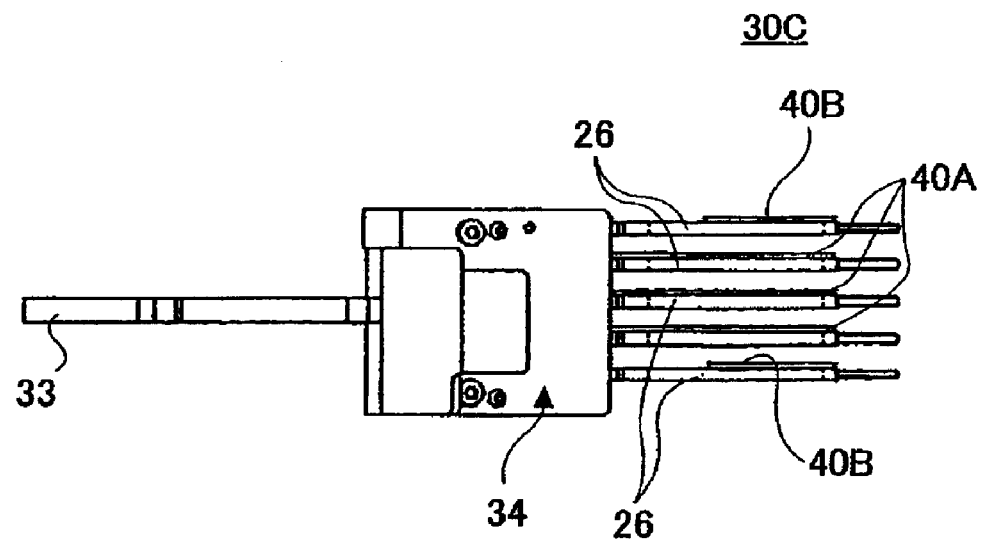
FIG. 11 is a front view of the head actuator in the second preferred embodiment of the invention.

Next, a description will be given of the second preferred embodiment of the invention. FIG. 10 and FIG. 11 show the head actuator 30C in the second preferred embodiment.

In the previous embodiment, the damper material 40A is arranged approximately in the whole region of the actuator arm 26. On the other hand, in the present embodiment, the damper material 40B is arranged on the actuator arm 26 partially as shown in FIG. 10.

Specifically, in this embodiment, as shown in FIG. 11, the damper material 40B arranged on the actuator arm 26 located in the topmost part and the actuator arm 26 located in the lowermost part is made to have the area smaller than that of the damper material 40A arranged on the other actuator arms 26. In the actuator arm 26 in which the damper material 40B is arranged, only approximately half of the actuator arm 26 is covered by the damper material 40B as shown in FIG. 10.

It is not necessarily required that the damper material be arranged on all over the actuator arm 26, and, as in the present embodiment, it is also appropriate that the damper material be arranged on the actuator arm 26 partially.

By arranging the damper material 40B on the actuator arm 26 partially, it is possible to adjust the vibration-proof effect of the magnetic disk device in accordance with the position and the area of the damper material 40B being arranged.

Figure 12:
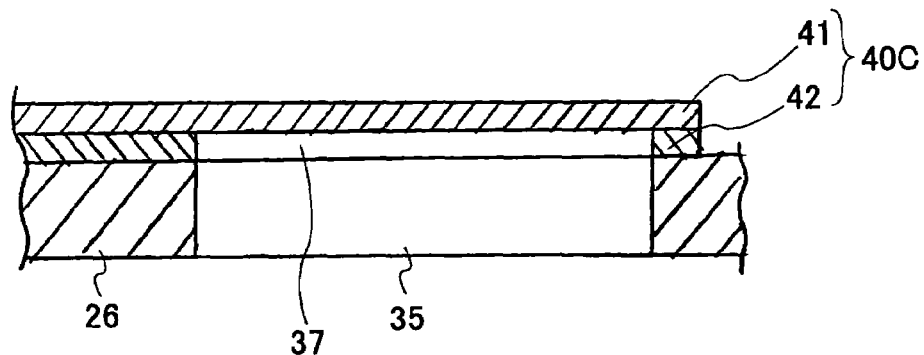
FIG. 12 is a cross-sectional view of the head actuator in the third preferred embodiment of the invention in the vicinity of the slot for weight reduction of the head actuator.

Next, a description will be given of the third preferred embodiment of the invention. FIG. 12 shows the head actuator 30D in the third preferred embodiment.

In the previous embodiment, the viscoelastic material 42 which constitutes the damper material 40A or 40B is provided also at the position opposing the position of the slot 35 as shown in FIG. 8.

On the other hand, the present embodiment is characterized in that part of the viscoelastic material 42 located at the position opposing the position of the damper material 40C where the slot 35 for the weight reduction is enclosed is removed, and the removal part 37 is formed. According to this composition, it is possible to prevent the dirt entering in the slot 35 from sticking to the viscoelastic material 42 at the time of the assembly, and therefore the reliability of the magnetic disk device in which the head actuator 30D is provided can be raised.

Namely, it is likely that dirt enters the slot 35 for the weight reduction, which is constituted by the recess or the opening. In the case where the viscoelastic material 42 (equivalent to the adhesive) is formed in the slot 35 at the position opposing the position of the slot 35, the dirt entering into the slot 35 will stick to the viscoelastic material 42.

And if the head actuator is assembled to the magnetic disk device in this state, the dirt will separate from the viscoelastic material 42 later after the assembly and will float within the magnetic disk device. If the dirt separated from viscoelastic material is included between the magnetic disk 23 and the magnetic head, the recording/reproducing characteristics of the magnetic disk device will deteriorate greatly, and the reliability of the magnetic disk device falls.

However, according to the present embodiment, the part of the viscoelastic material 42 located at the position opposing the position of the slot 35 is removed, and the removal part 37 is formed, thereby preventing the dirt from sticking to the viscoelastic material 42.

For this reason, even after the head actuator 30D is assembled to the magnetic disk device, the inside of the magnetic disk device can be maintained in the clean state, and therefore the reliability of the magnetic disk device can be raised.

Figure 13:
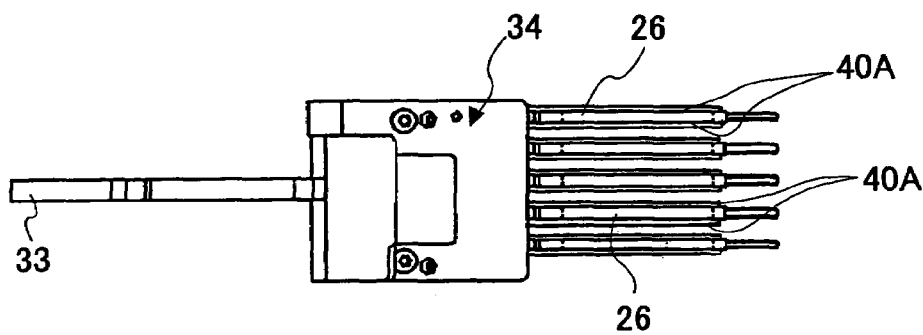
FIG. 13 is a front view of the head actuator in the fourth preferred embodiment of the invention.
Figure 14:
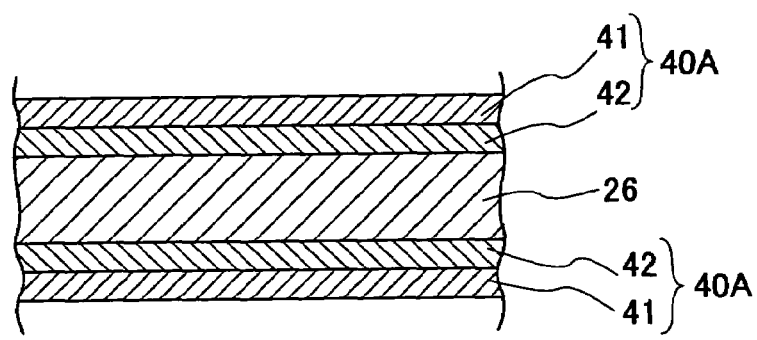
FIG. 14 is a cross-sectional view of the head actuator in the fourth preferred embodiment of the invention.

Next, a description will be given of the fourth preferred embodiment of the invention. FIG. 13 and FIG. 14 show the head actuator 30E in the fourth preferred embodiment.

In the present embodiment, the above-described damper material 40A is arranged on both sides of the actuator arm 26 symmetrically. Specifically, the damper materials 40A of the same form are arranged on the top surface and the bottom surface of each of the actuator arms 26 in the same conditions.

According to the composition of this embodiment in which the damper material 40A is arranged on both sides of the actuator arm 26 symmetrically, the balance of the actuator arm 26 becomes appropriate to withstand vibrations, and it is possible to suppress more effectively unnecessary vibrations from occurring on the actuator arm 26.

Figure 15:
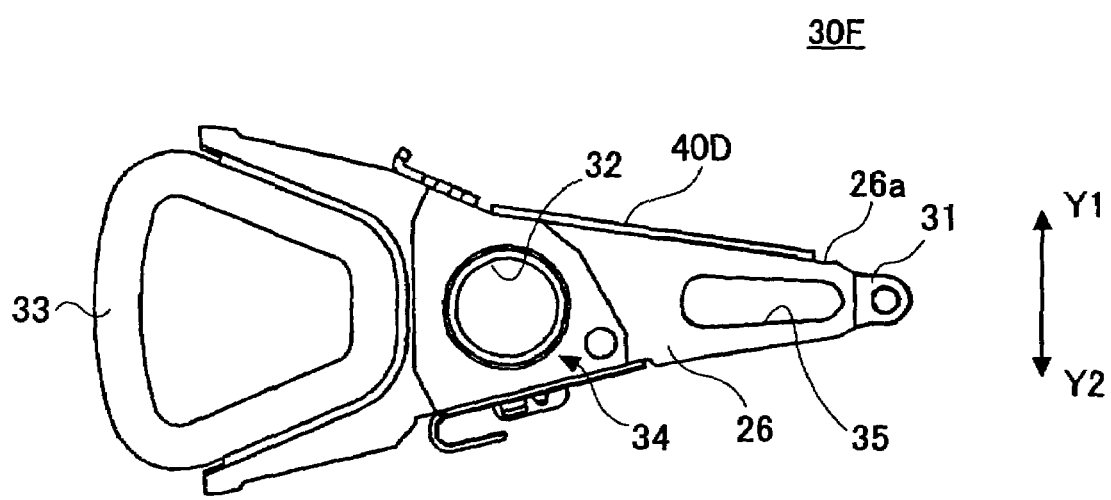
FIG. 15 is a plan view of the head actuator in the fifth preferred embodiment of the invention.
Figure 16:
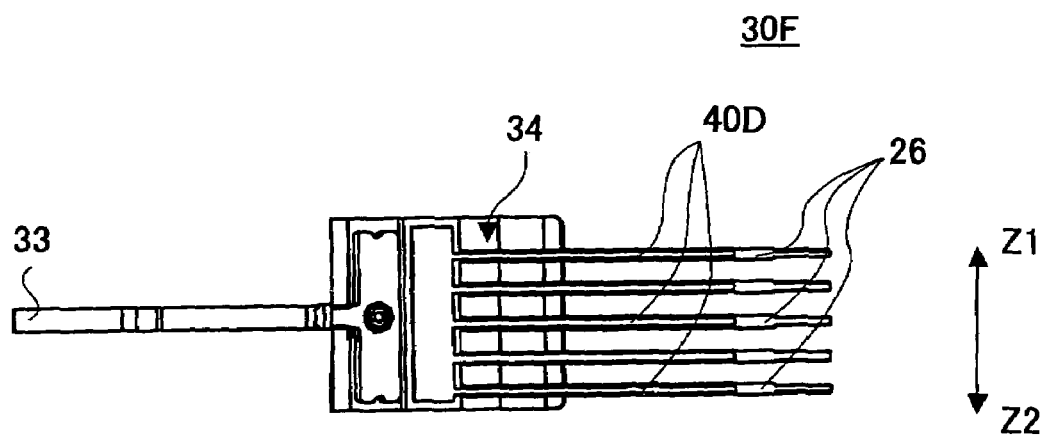
FIG. 16 is a front view of the head actuator in the fifth preferred embodiment of the invention.

Next, a description will be given of the fifth preferred embodiment of the invention. FIG. 15 and FIG. 16 show the head actuator 30F in the fifth preferred embodiment.

In the previous embodiment, the damper material 40A-40C is arranged on either the top surface or the bottom surface of the actuator arm 26. On the other hand, the present embodiment is characterized in that the damper material 40D is arranged on the side surface 26a of the actuator arm 26.

Figure 17:
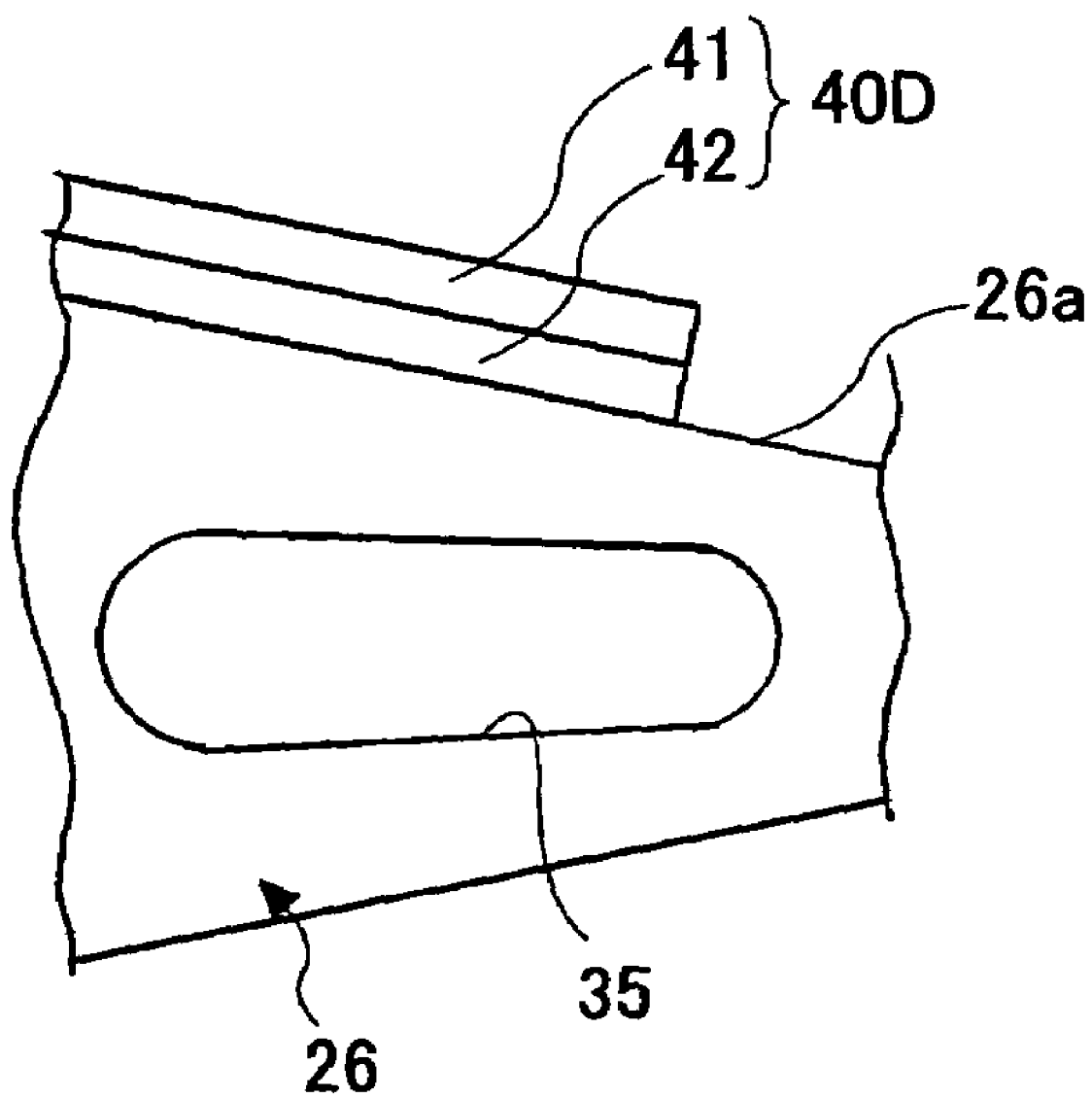
FIG. 17 is an enlarged plan view of the head actuator in the fifth preferred embodiment of the invention in the vicinity of the slot for weight reduction of the head actuator.

This damper material 40D is of the same composition as the above-mentioned damper material 40A-40C, and, as shown in FIG. 17, the damper material 40D comprises the restriction material 41 and the viscoelastic material 42.

The aerodynamic oscillation force, which is applied to the actuator arm 26 when the magnetic disk 23 is rotated, is exerted not only in the directions indicated by the arrows Z1 and Z2 in FIG. 16 but also in the surface directions of the actuator arm 26 indicated by the arrows Y1 and Y2 in FIG. 15. In order to suppress the aerodynamic oscillation force applied in the directions indicated by the arrows Z1 and Z2 in FIG. 16, it is effective to arrange the damper material 40A-40C on the top surface and the bottom surface of the actuator arm 26 as in the previous embodiment. However, according to the composition of the previous embodiment, the aerodynamic oscillation force applied in the directions indicated by the arrows Y1 and Y2 in FIG. 15 cannot be adequately suppressed.

For this reason, the damper material 40D in this embodiment is arranged on the side surface 26a of the actuator arm 26. According to this embodiment, it is possible to prevent the vibrations from occurring on the actuator arm 26 due to the aerodynamic oscillation force applied in the directions indicated by the arrows Y1 and Y2 in FIG. 15, and it is possible to suppress the unnecessary vibrations from occurring in the surface directions of the actuator arm 26.

In addition, in the present embodiment, the composition in which the damper material 40D is arranged only on the side surface 26a of the actuator arm 26. It is a matter of course that the composition in which the damper material 40A-40C is additionally arranged on the top surface and the bottom surface of the actuator arm 26 is also appropriate.

Figure 18:
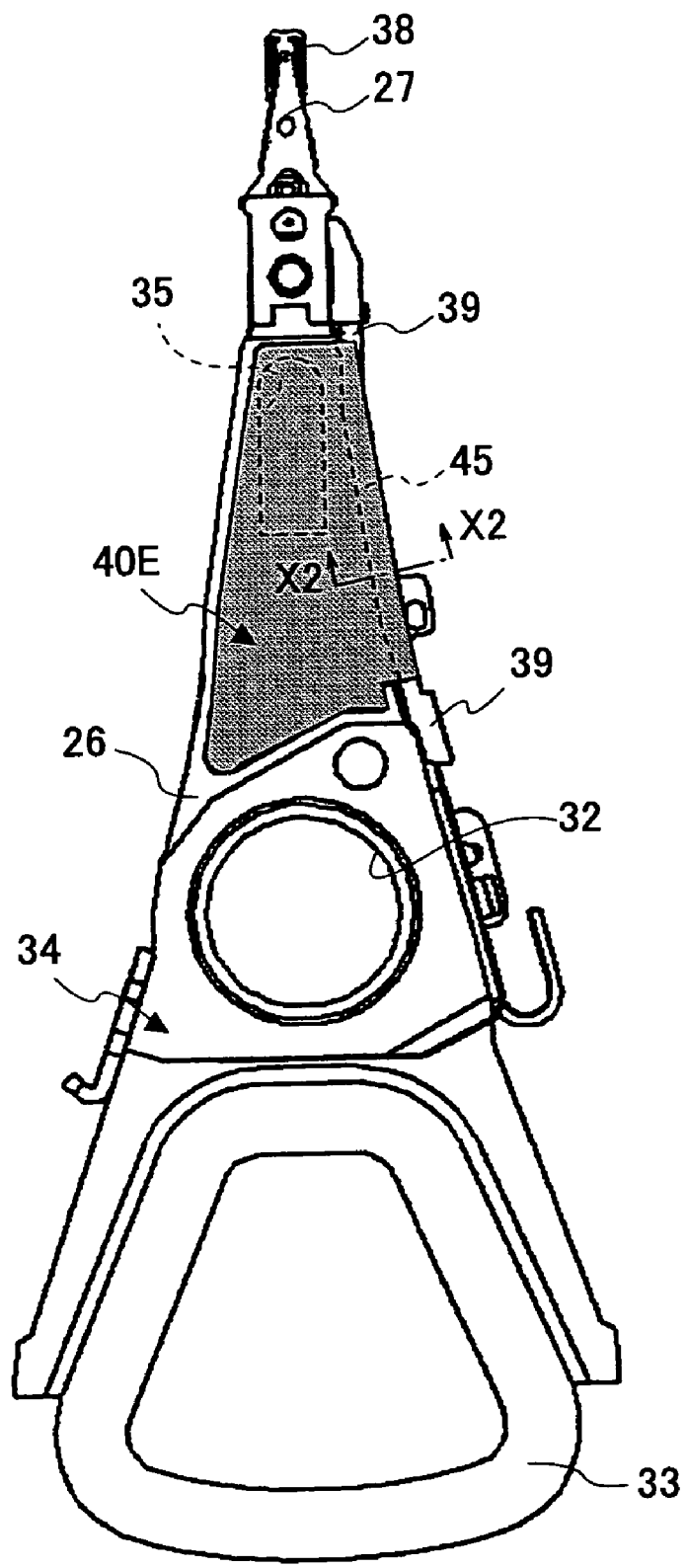
FIG. 18 is a plan view of the head actuator in the sixth preferred embodiment of the invention.
Figure 19:
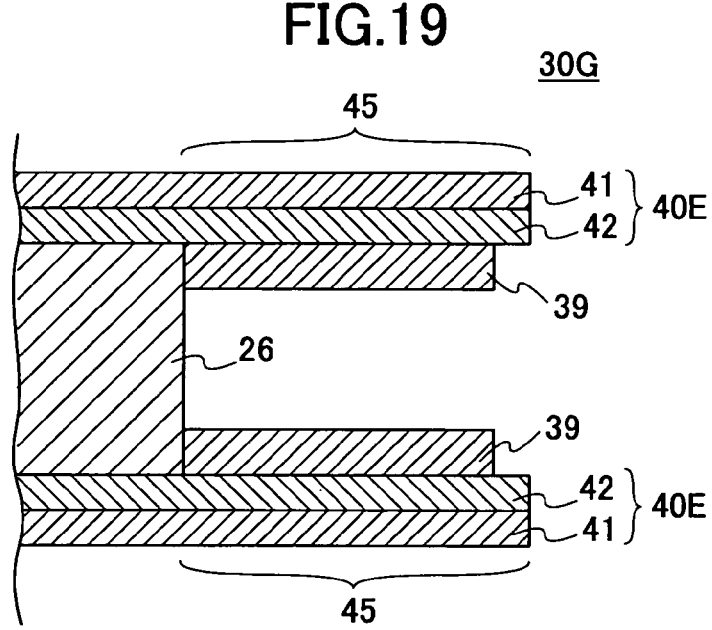
FIG. 19 is a cross-sectional view of the heat actuator which is taken along the X2-X2 line in FIG. 18.

Next, a description will be given of the sixth preferred embodiment of the invention. FIG. 18 and FIG. 19 show the head actuator 30G in the sixth preferred embodiment.

As shown in FIG. 18, the suspension 27 in which the magnetic head 38 is provided is fixed to the leading edge of the actuator arm 26.

This magnetic head 38 is arranged so that the flexible wiring (called the wiring FPC) from the magnetic head 38 is extended to the side part of the E-block 34 through the suspension 27 and the actuator arm 26. The wiring FPC is bonded to the suspension 27 by the adhesive so that the integral structure of the wiring FPC and the suspension 27 is formed.

Hereinafter, the portion of the wiring FPC which extends from the suspension 27 (which portion is arranged on the actuator arm 26) is called the tail part 39 of the suspension 27.

Figure 20:
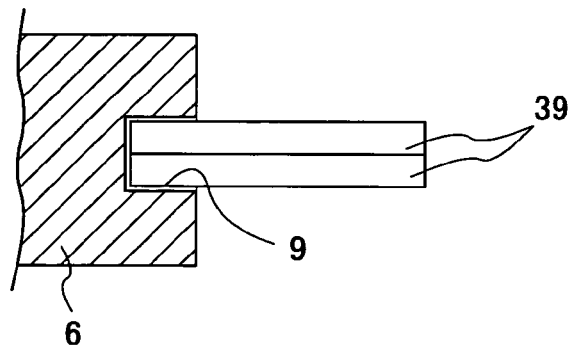
FIG. 20 is a cross-sectional view of the fixed structure of the tail part of a conventional head actuator.

In the case of the conventional head actuator, the groove 9 is formed in the side part of the actuator arm 6, and the tail part 39 of the suspension 7 is fitted in the groove 9 as shown in FIG. 20, so that the wiring between the suspension 7 and the E-block is arranged.

However, according to the composition of the conventional head actuator, the tail part 39 (the flexible wiring) is affected by the aerodynamic vibrations, and as a result the vibrations of the actuator arm 6 occur.

To obviate the problem, according to the present embodiment, the damper material 40E is arranged so that it extends sidewise from the actuator arm 26, the extended part 45 is formed, and the tail part 39 of the suspension 27 arranged in the extended part 45 as shown in FIG. 19. Namely, the damper material 40E is formed with the extended part 45 which extends sidewise from the actuator arm 26, and the viscoelastic material 42 is exposed to the bottom surface of the extended part 45.

The present embodiment is characterized in that the tail part 39 of the suspension 27 is bonded to the exposed viscoelastic material 42. Thereby, the tail part 39 is attached to the actuator arm 26 by using the viscoelastic material 42.

According to the composition of the present embodiment, it is no longer necessary to provide the additional composition (the groove 9) for fixing the tail part 39 to the actuator arm 26 as in the conventional head actuator, and the composition of the head actuator 30G can be simplified.

Moreover, the tail part 39 is fixed to the damper material 40E provided with the restriction material 41 having the high rigidity, and it is possible to prevent the unnecessary vibrations from occurring on the actuator arm 26 due to the tail part 39 even if the aerodynamic oscillation force is exerted.

Figure 21:
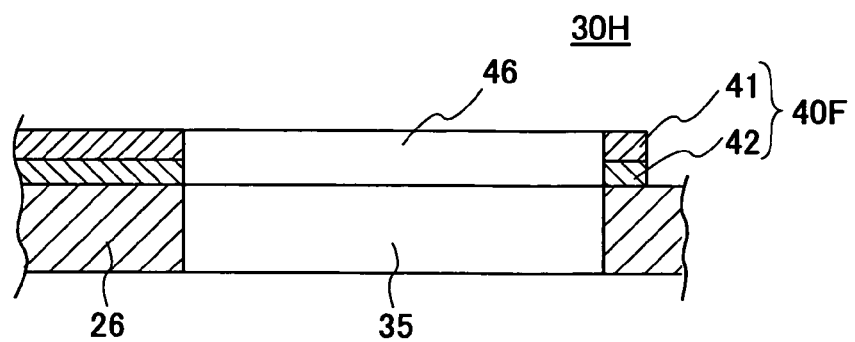
FIG. 21 is an enlarged plan view of the head actuator in the seventh preferred embodiment of the invention in the vicinity of the slot for weight reduction of the head actuator.

Next, a description will be given of the seventh preferred embodiment of the invention. FIG. 21 shows the head actuator 30H in the seventh preferred embodiment.

In the present embodiment, the opening 46 is formed in the damper material 40F at the position opposing the position of the slot 35 for the weight reduction. Therefore, neither the restriction material 41 nor the viscoelastic material 42 exists at the position of the damper material 40F opposing the position where the slot 35 for the weight reduction is formed.

When the aerodynamic oscillation force exerted to the actuator arm 26 by the air flow which passes the slot 35 for the weight reduction is small according to the rotation speed of the magnetic disk 23, the damper material 40F is formed with the opening 46, and the moment of inertia of the actuator arm 26 including the damper material 40F can be reduced.

Moreover, the parts of the actuator arm 26 other than the position where the slot 35 is formed have the high rigidity raised by the damper material 40F, and it is possible to suppress the vibrations from occurring on the actuator arm 30H. This makes it possible to attain the high-speed seek processing and the highly accurate positioning processing of the magnetic head compatibly with the moving processing of the magnetic head.

The present invention is not limited to the above-described embodiments, and variations and modifications may be made without departing from the scope of the present invention.

What is claimed is:

1. A magnetic head actuator comprising:
   an actuator arm in which a suspension for supporting a magnetic head is provided, the actuator arm being rotated around a rotation axis to move the magnetic head to a predetermined position on a magnetic disk; and
   a damper material fixed to at least one side of the actuator arm, the damper material increasing a rigidity of the actuator arm and absorbing vibrations of the actuator arm,
   wherein the actuator arm is formed with a weight-reduction part, and the damper material is arranged partially on the weight-reduction part without separating the weight-reduction part into two parts.

2. The magnetic head actuator according to claim 1 wherein the damper material is arranged on both sides of the actuator arm symmetrically.

3. The magnetic head actuator according to claim 1 wherein the damper material is made of a material having a rigidity higher than a rigidity of aluminum.

4. The magnetic head actuator according to claim 1 wherein the damper material is made of a stainless steel.

5. The magnetic head actuator according to claim 1 wherein an opening is formed in the weight-reduction part at a position of the damper material opposing the weight-reduction part.

6. The magnetic head actuator according to claim 1, wherein the damper material comprises a restriction material and a viscoelastic material, the restriction material suppressing vibrations of the actuator arm, and the viscoelastic material absorbing vibrations of the actuator arm.

7. The magnetic head actuator according to claim 6 wherein the damper material is arranged on both sides of the actuator arm symmetrically.

8. The magnetic head actuator according to claim 6 wherein the damper material is made of a material having a rigidity higher than a rigidity of aluminum.

9. The magnetic head actuator according to claim 6 wherein the damper material is made of a stainless steel.

10. The magnetic head actuator according to claim 6 wherein a part of the viscoelastic material located at a portion of the damper material opposing the position of the weight-reduction part is removed.

11. The magnetic head actuator according to claim 6 wherein an opening is formed in the weight-reduction part at a position of the damper material opposing the weight-reduction part.

12. The magnetic head actuator according to claim 6 wherein a tail part of the suspension is attached to the actuator arm using the viscoelastic material.

13. A magnetic disk device including a magnetic disk provided as a recording medium, a rotation unit rotating the magnetic disk, and a magnetic head actuator, the magnetic head actuator comprising:
   an actuator arm in which a suspension for supporting a magnetic head is provided, the actuator arm being rotated around a rotation axis to move the magnetic head to a predetermined position on a magnetic disk; and
   a damper material fixed to at least one side of the actuator arm, the damper material increasing a rigidity of the actuator arm and absorbing vibrations of the actuator arm,
   wherein the actuator arm is formed with a weight-reduction part, and the damper material is arranged partially on the weight-reduction part without separating the weight-reduction part into two parts.

14. The magnetic head actuator according to claim 13, wherein the damper material comprises a restriction material and a viscoelastic material, the restriction material suppressing vibrations of the actuator arm, and the viscoelastic material absorbing vibrations of the actuator arm.

* * * * *